No. 784,451. PATENTED MAR. 7, 1905.
F. H. VAN HOUTEN.
DOUGH DIVIDING MACHINE.
APPLICATION FILED DEC. 21, 1903.
5 SHEETS—SHEET 2.
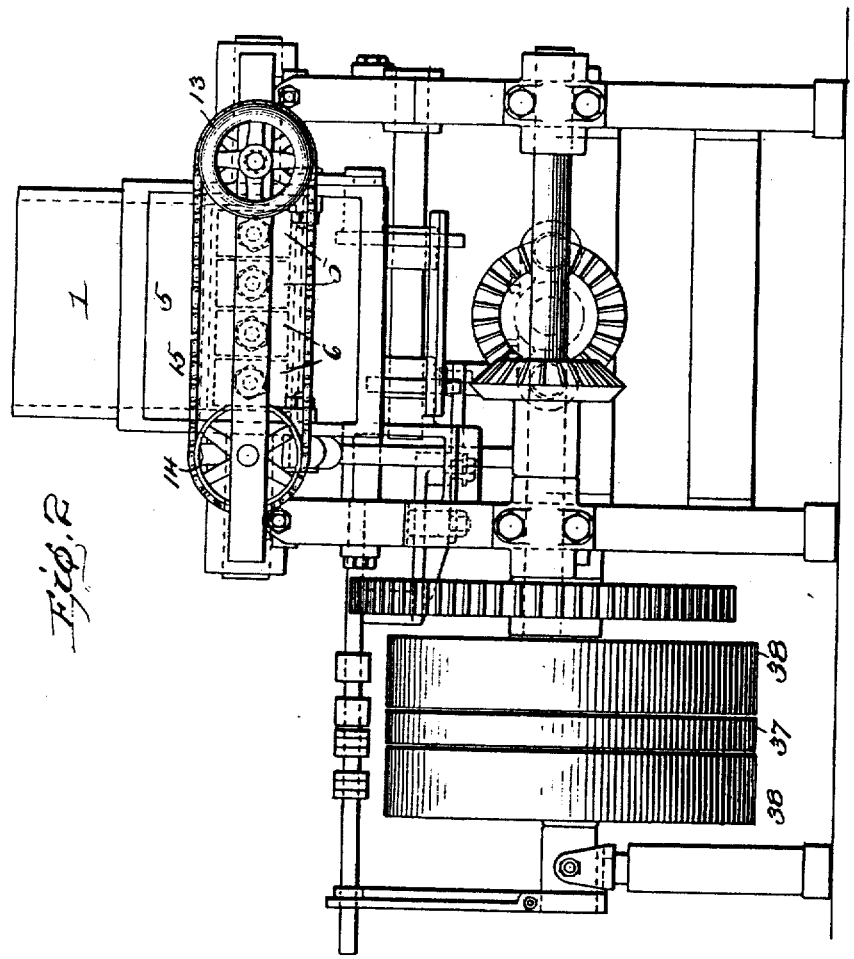

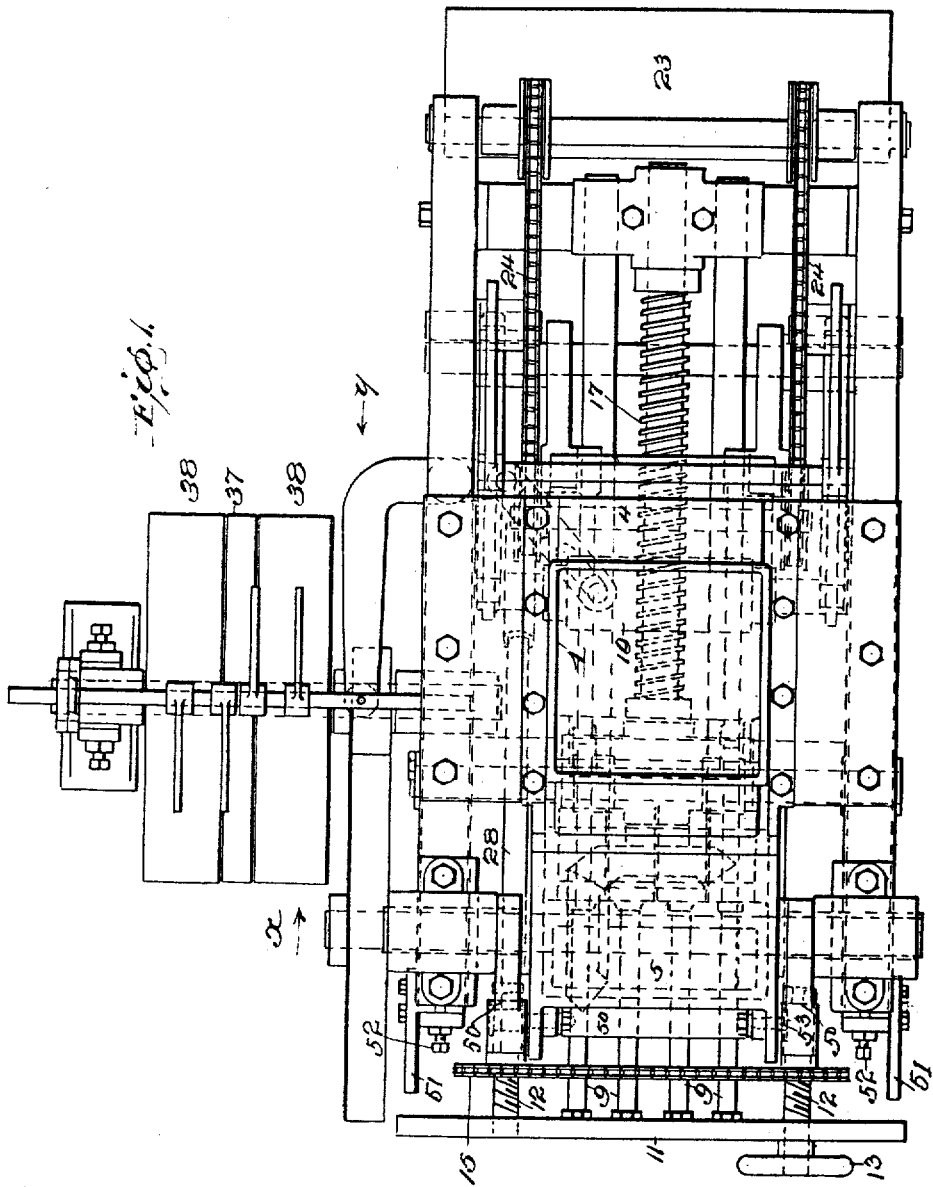

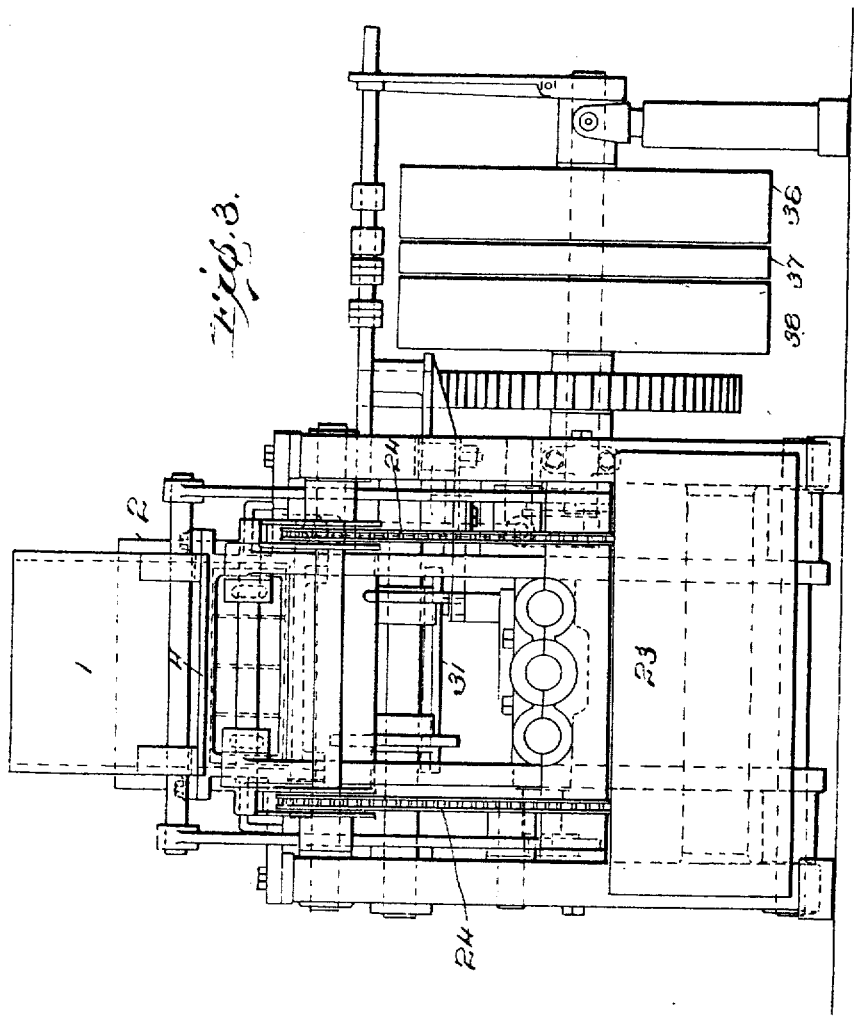

No. 784,451. PATENTED MAR. 7, 1905.
F. H. VAN HOUTEN.
DOUGH DIVIDING MACHINE.
APPLICATION FILED DEC. 21, 1903.
5 SHEETS—SHEET 4.
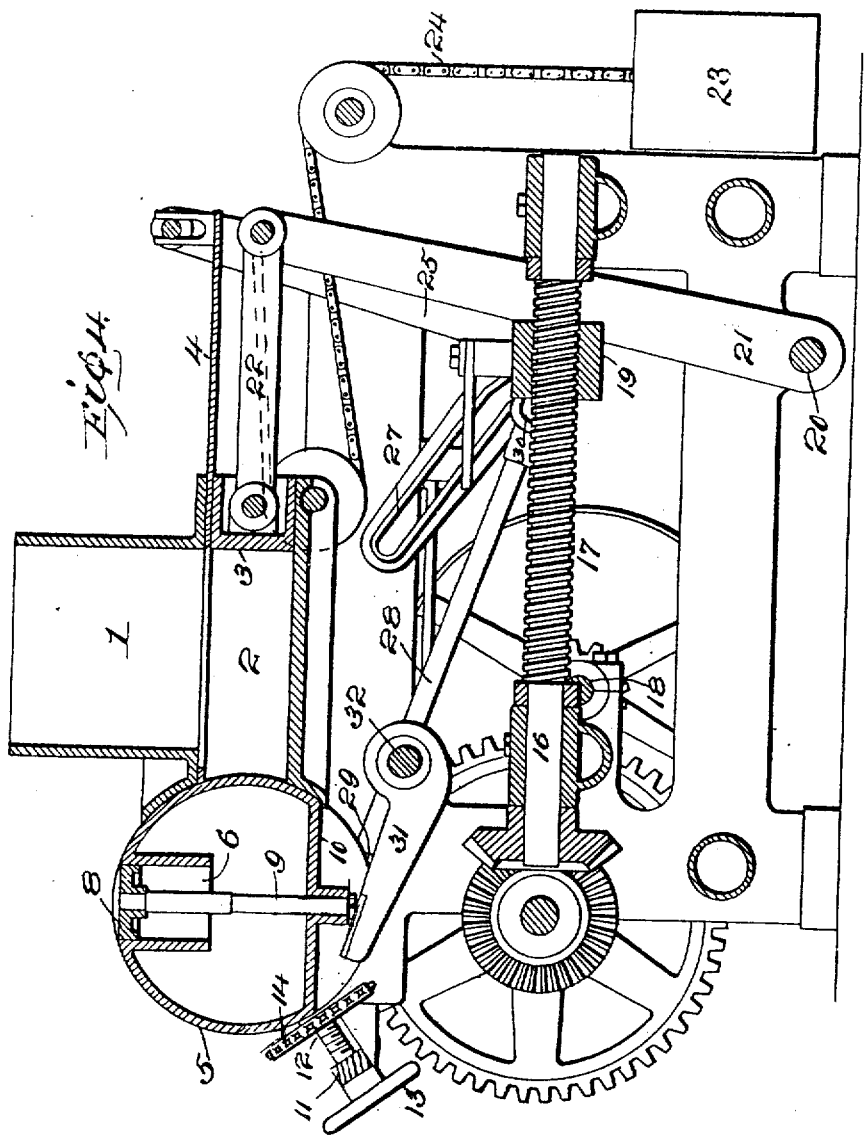

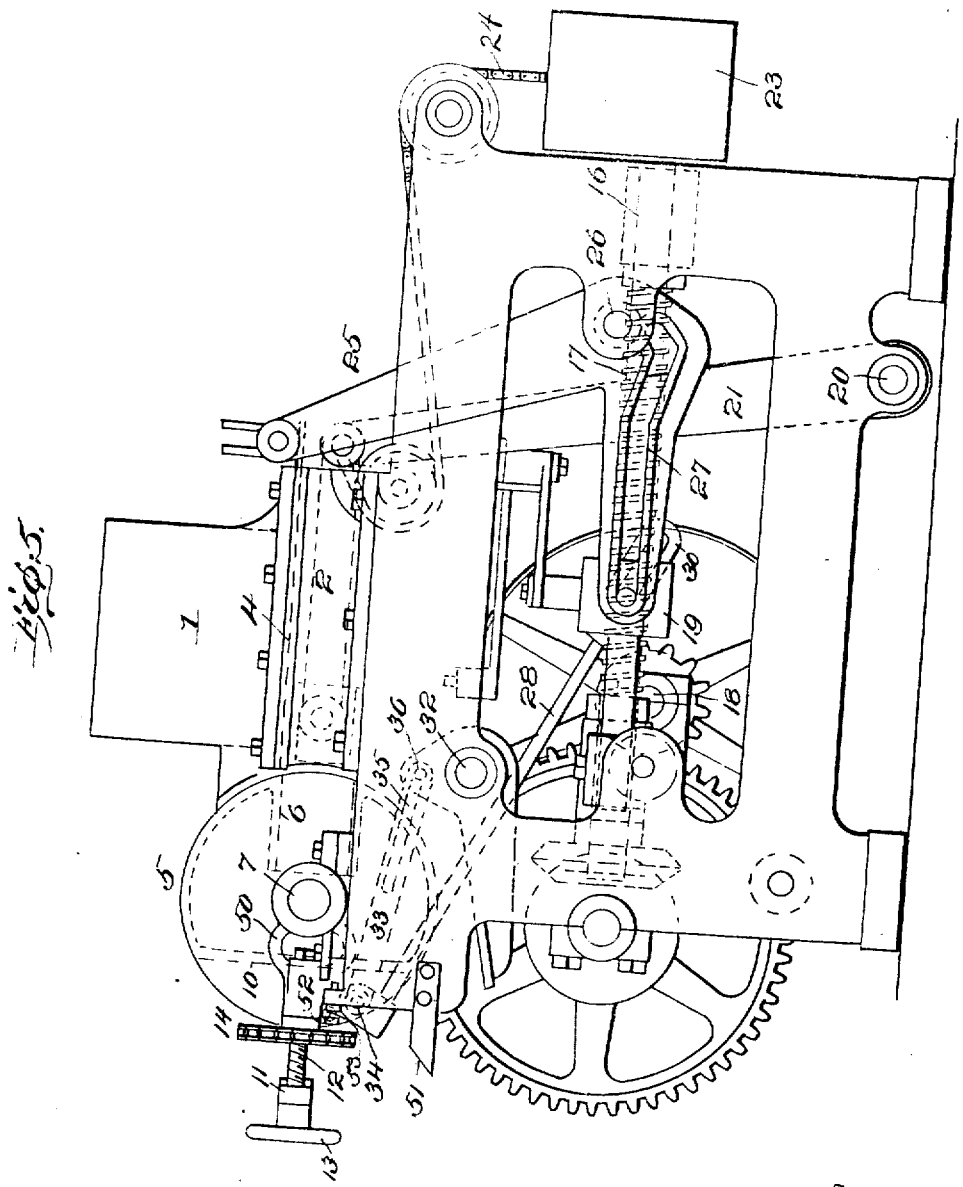

No. 784,451. Patented March 7, 1905.

UNITED STATES PATENT OFFICE.

FRANK H. VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-DIVIDING MACHINE.

SPECIFICATION forming part of Letters Patent No. 784,451, dated March 7, 1905.

Application filed December 21, 1903. Serial No. 186,100.

*To all whom it may concern:*

Be it known that I, FRANK H. VAN HOUTEN, a citizen of the United States, residing at Fishkill-on-the-Hudson, in the county of Dutchess and State of New York, have invented certain new and useful Improvements in Dough-Dividing Machines; and I do hereby declare the following to be a full, clear, and exact description of the same, reference being had to the accompanying drawings, forming a part of this specification, and to the figures of reference marked thereon.

My invention relates to the art of compressing and dividing materials, such as dough, to be worked up further in smaller masses, and has for its principal object the production of a machine which will efficiently and automatically separate comparatively small portions of the material from a batch, compress said portions to a desired density, and measure off the portions of equal size for which the machine has been adjusted, so that loaves of uniform weight may be produced.

In carrying the invention into effect I provide a hopper for the reception of the dough or other material, a compression-chamber fed from the hopper, means for separating and for compressing the dough in the compression-chamber from that in the hopper, and a measuring mold or molds formed in a movable cylinder and adapted to be moved into and out of alinement with the compression-chamber and to coöperate therewith. These elements and the novel and efficient mechanism coacting with and operating them to produce the desired results are illustrated in the accompanying drawings and will be described in the following specification, which sets forth a preferred embodiment of my invention.

In the drawings, in which like reference characters indicate corresponding parts throughout the several figures, Figure 1 is a plan view of a dough-dividing machine constructed according to my invention. Fig. 2 is a front elevation looking in the direction of arrow *x*, Fig. 1. Fig. 3 is a rear elevation looking in the direction of arrow *y*, Fig. 1. Fig. 4 is a vertical longitudinal section through the central portion of the machine, showing the parts in their initial position ready to start a cycle of operations; and Fig. 5 is a side elevation showing the position of the parts at the end of the cutting and compressing steps.

Referring to the drawings, 1 is a hopper and 2 a compression-chamber communicating therewith. The compression-chamber 2 is fitted with a plunger 3 at one end adapted to reciprocate therein, and above this plunger a slide-knife 4 is provided for separating a mass of dough to be compressed from the batch in the hopper and to complete its inclosure in the compression-chamber.

At the forward end of compression-chamber 2—that is, the end in front of plunger 3—I provide a movable cylinder 5, carrying measuring molds or compartments 6, having their outer openings in alinement longitudinally upon the cylinder. In the present instance I have shown four of these molds to measure off and divide four pieces of dough simultaneously; but it will be understood that more or fewer may be employed, if desired. Cylinder 5 is movably mounted in bearings upon the machine-frame at 7 and is capable of oscillation upon said bearings one-fourth of a revolution to bring the molds 6 from a vertical position into alinement with compression-chamber 2. At the mouth of the compression-chamber abutting cylinder 5 the walls are flared and machined to make a close-fitting joint with the cylinder-surface.

Working within molds 6 are pistons 8, each having a piston-rod 9, extending to the side 10 of the cylinder behind the molds, this side of the cylinder being preferably flattened, as shown in Fig. 4.

Near cylinder 5 is a stop-bar 11 for the ends of piston-rods 9, adjustably mounted on screws 12. One of screws 12 has a hand-wheel 13, from which simultaneous movement is communicated to the other screw 12 by sprockets 14 and chain 15. By these means the movement of pistons 8 may be limited and the capacity of measuring-molds 6 varied.

A shaft 16, having a screw-threaded portion 17, is longitudinally mounted in suitable bearings upon the machine-frame and connected by suitable gearing to a drive-shaft 18. Mounted on the screw-threaded portion 17 of shaft 16 is a nut 19, which constitutes a reciprocatory member acting under reversed revolutions of shaft 16 and which is the principal actuating and controlling part of the machine.

Pivoted to the frame at 20 are upwardly-extending levers 21, connected by rods 22 to plunger 3. A weight 23 is connected by chain 24 or other flexible connection passing over suitable pulleys with the upper ends of levers 21 and constitutes driving means for plunger 3. Levers 21 are pressed by the action of weight 23 against lugs extending upon either side of nut 19, so that the movements of said levers, and consequently of plunger 3, are governed by the movements of nut 19.

Bell-crank levers 25, pivoted to the frame at 26, each have an upwardly-extending arm connected to slide-knife 4. The other arm of each bell-crank lever 25 has a slot 27, in which works a projection of nut 19 for operating said levers.

A connecting-rod 28, attached at one end to cylinder 5 at 29 and at the other end by a lost-motion connection to nut 19, serves to transmit motion from said nut to operate the cylinder. This lost-motion connection comprises a slotted enlargement 30 upon rod 28, in the slot of which works a pin carried by the nut.

In order to eject compressed and divided dough from molds 6, I provide a bell-crank lever 31, pivoted to the machine-frame at 32. This lever is operated from the cylinder 5 by a connecting-rod 33, pivoted to said cylinder at 34 and having a lost-motion connection with lever 31, comprising a slot 35 in the rod, in which works a pin 36 upon one arm of the lever. The other arm of lever 31 projects under cylinder 5 and is adapted to contact with piston-rods 9 to drive pistons 8 upwardly when cylinder 5 is in the proper position.

Motion is imparted to shaft 16, first in one direction and then in the other, by suitable means, such as belts running in opposite directions upon pulleys on the drive-shaft 18. As shown, 37 is a fixed pulley upon said shaft, and 38 represents loose pulleys, a belt-shifter operated by nut 19 being employed to bring the belts alternately upon the fixed pulley 37 at the proper time in the operation of the machine.

The operation is as follows: The initial position of the parts may be considered as that shown in Fig. 4, plunger 3 and knife 4 being in their extreme retracted position and molds 6 facing upwardly out of alinement with compression-chamber 2. A batch of dough is thrown into hopper 1 and settles into compression-chamber 2. The drive-shaft being started, shaft 16 rotates in a direction to cause nut 19 to begin its travel along the screw-threaded portion 17. The action of weight 23, which presses levers 21 against the nut, then causes said levers to follow the nut, thereby beginning the movement of plunger 3 and settling the dough well in the compression-chamber. After only a slight or fractional movement of plunger 3 in the compression-chamber the nut acting upon levers 25 in slots 27 throws knife 4 forward, cutting off the dough in compression-chamber 2 and completely inclosing it within the compression-chamber. As the nut advances plunger 3 continues to advance and compresses the confined dough to a uniform cake or brick. When nut 19 commenced its advance, no motion was communicated to cylinder 5 through connecting-rod 28 owing to the lost-motion connection of said rod with the nut; but upon further movement of the nut connecting-rod 28 starts the rotation of cylinder 5, the parts being so proportioned as to bring molds 6 into alinement with compression-chamber 2 after the compression of the confined dough is completed. The dough then passes into and fills the molds, forcing pistons 8 back until rods 9 engage stop 11. The parts are now in the position shown in Fig. 5. At this time the belt-shifter operates to reverse the rotation of the shafts and the motion of nut 19 is reversed. Owing, however, to the lost-motion connection between the nut and cylinder and the fact that the nut has not yet made contact again with levers 21, there is a slight pause in the operation of the parts, allowing the dough to completely fill molds 6. As the nut continues its backward movement it acts upon connecting-rod 28 to rotate cylinder 5, cutting off the dough in the molds from that remaining in the compression-chamber, and when this cutting off is complete the nut engages levers 21 to retire plunger 3. During the backward rotation of cylinder 5 connecting-rod 33 slides on pin 36 until the end of the slot 35 is reached, when lever 31 is rocked and forces pistons 8 upward to eject the divided dough. The nut is now approaching its initial position and by acting upon levers 21 and 25 restores plunger 3 and knife 4 to the positions which they first occupied. The belts are now again shifted and the cycle of movements begins again.

It will be seen from Figs. 4 and 5 that the stop-bar 11 has a movement coinciding with the movement of the cylinder throughout a portion of the movement of the latter in order that the plungers 8 may be supported until communication with the compression-chamber is cut-off. Of course the stop-bar might be curved and wide enough to accomplish this end by allowing the ends of the stems 9 to travel over its inner surface; but in the preferred construction the screws are mounted in carriers 50, journaled on the shaft 7 and adapted to normally rest against stops 51, secured to the main frame, (as in Fig. 4,) but to be lifted by the studs 34 when the plungers come into line with the stop-bar and to maintain such alinement throughout that part of the movement of the cylinder when the mold is open to the compression-chamber.

The ends of the stems 9 only move away from the stop-bar when the stop-bar is arrested in its downward movement by the rests 51, before referred to, when they move over the end of the lever-frame 31 in position to be elevated by the latter to discharge the dough.

From an inspection of Figs. 1 and 5 it will also be seen that the bearings for the shaft 7 and cylinder are adjustable by set-screws 52, thereby permitting the cylinder to be set up tightly against the face of the compression-chamber to prevent any leakage or squeezing out of the dough between the two.

I have employed the term "cylinder" in describing the mold-carrying element; but it will be understood that this element is not necessarily a complete cylinder in form. Many changes also in the arrangement of parts and details of construction may be made without departing from the invention, and these, I wish it understood, fall strictly within the scope and purview thereof. It will also be understood that my improvements and subcombinations of parts are applicable to machines for dividing and working up materials other than dough.

Having thus described my invention, what I claim as new, and desire to secure by Letters Patent, is—

1. The combination of a hopper, a compression-chamber in communication therewith, a mold adapted to be brought into and out of alinement with said compression-chamber, a plunger in said compression-chamber, a power-driven shaft having a portion provided with a screw-thread, and a nut coöperating with said screw-thread and controlling the movement of said plunger.

2. The combination of a hopper, a compression-chamber in communication therewith, a mold adapted to be brought into and out of alinement with said compression-chamber, a plunger in said compression-chamber, a power-driven shaft having a portion provided with a screw-thread, a weight having a flexible connection with said plunger to operate the same, and a nut coöperating with said screw-thread to permit or restrain the operation of the weight.

3. The combination of a hopper, a compression-chamber in communication therewith, a mold adapted to be brought into and out of alinement with said compression-chamber, a plunger in said compression-chamber, a power-driven shaft having a portion provided with a screw-thread, a nut coöperating with said screw-thread for controlling the movement of said plunger, and means for reversing the direction of rotation of said shaft.

4. The combination of a hopper, a compression chamber in communication therewith, a mold adapted to be brought into and out of alinement with said compression-chamber, a plunger in said compression-chamber, a shaft provided with a screw-thread, a nut mounted upon the screw-threaded portion of said shaft, means for rotating the shaft alternately in opposite directions, a lever connection between said nut and plunger, and means operated by the movement of said nut for moving said mold into and out of alinement with said compression-chamber.

5. The combination of a hopper, a compression-chamber in communication therewith, a mold adapted to be brought into and out of alinement with said compression-chamber, means for compressing the contents of said chamber, a shaft provided with a screw-thread, a nut mounted upon the screw-threaded portion of said shaft, means for rotating the shaft alternately in opposite directions, and a connection between said nut and mold whereby said mold is caused by the movement of said nut to move into and out of alinement with said compression-chamber.

6. The combination of a hopper, a compression-chamber in communication therewith, a plunger in said chamber, a mold adapted to be brought into and out of alinement with said compression-chamber, a reciprocatory member, and independent connections intermediate the plunger and mold and said reciprocatory member for actuating said plunger and said mold.

7. The combination of a compression-chamber provided with a plunger, a movable cylinder carrying a plurality of molds adapted to be brought into and out of alinement with said compression-chamber, a reciprocatory member, and independent connections intermediate the plunger and cylinder and said reciprocatory member for actuating said plunger and said movable cylinder.

8. The combination of a hopper, a compression-chamber in communication therewith, a plunger in said compression-chamber, a weight connected for advancing said plunger, a knife to separate the material to be compressed in the compression-chamber from the body of material in the hopper, a reciprocatory member, a lever connection between said reciprocatory member and said knife, and a second and independent lever connection between said reciprocatory member and said plunger.

9. The combination of a hopper, a compression-chamber in communication therewith, a plunger in said compression-chamber, a weight connected for advancing said plunger, a mold adapted to be brought into and out of alinement with said compression-chamber, a knife to separate the material to be compressed in the compression-chamber from the body of material in the hopper, a reciprocatory member, and independent connecting mechanism from said reciprocatory member to said knife and to said plunger arranged to cause the complete separating movement of said knife during a fractional compressing movement of said plunger.

10. The combination of a hopper, a compression-chamber in communication therewith, a plunger in said chamber, means for actuating said plunger, a mold adapted to be brought into and out of alinement with said compression-chamber, a knife to separate the material to be compressed in said compression-chamber from the body of material in the hopper, a reciprocatory member, a connection between said reciprocatory member and said plunger, and an independent lever connection between said reciprocatory member and said knife.

11. The combination of a hopper, a compression-chamber in communication therewith, means for compressing the contents of said chamber, a movable cylinder carrying a mold adapted to be brought into and out of alinement with said compression-chamber, a piston in said mold, a reciprocatory member, mechanism controlled by said reciprocatory member for actuating said compressing means and said movable cylinder, and a connection from said cylinder to said piston for ejecting the contents of said mold when the latter is out of alinement with said compression-chamber.

12. The combination of a hopper, a compression-chamber in communication therewith, a movable cylinder carrying a mold adapted to be brought into and out of alinement with said compression-chamber, a reciprocatory member, and a lost-motion connection between said reciprocatory member and said mold-carrying cylinder.

13. The combination with a hopper, a compression-chamber in communication therewith, a movable cylinder carrying a mold adapted to be brought into and out of alinement with said compression-chamber, a piston in said mold, a reciprocatory member, an operative connection between said reciprocatory member and said mold-carrying cylinder, and a lost-motion connection from said cylinder to said piston for ejecting the contents of said mold when the latter is out of alinement with said compression-chamber.

14. The combination with a hopper, a compression-chamber in communication therewith, a plunger in said compression-chamber, a weight connected for actuating said plunger, a knife to separate the material to be compressed in the compression-chamber from the body of material in the hopper, a reciprocatory member, a lever connection between said reciprocatory member and said knife, a lever connection between said reciprocatory member and said plunger, a mold-carrying cylinder, and an operative connection from said reciprocatory member to said mold.

15. In a dough-dividing machine, the combination with the hopper compression-chamber and mold for receiving the dough from the compression-chamber, of the plunger and knife movable toward the mold in the same direction, mechanism for giving the knife an initial movement in advance of the plunger and mechanism for holding the knife and plunger advanced during the filling of the mold; substantially as described.

16. In a dough-dividing machine, the combination with the hopper compression-chamber, mold movable into and out of registry with the compression-chamber and means for discharging material into said mold, of an adjustable stop controlling the capacity of the mold, means for moving said stop in unison with the mold when the mold is open to the compression-chamber and means for discharging the material from the mold; substantially as described.

17. In a dough-dividing machine, the combination with the hopper compression-chamber, mold movable into and out of registry with the compression-chamber and a plunger in said mold for regulating its capacity, of an adjustable stop for limiting the inward movement of the plunger, supports for the stop movable with the mold when the latter is open to the compression-chamber and a reciprocatory member for advancing the plunger to discharge the contents of the mold; substantially as described.

F. H. VAN HOUTEN.

Witnesses:
C. VAN NOSTRAN,
THOMAS DURANT.